US011915452B2

(12) United States Patent
Hiraishi

(10) Patent No.: US 11,915,452 B2
(45) Date of Patent: Feb. 27, 2024

(54) INFORMATION PROCESSING DEVICE AND INFORMATION PROCESSING METHOD

(71) Applicant: SONY GROUP CORPORATION, Tokyo (JP)

(72) Inventor: Kazuki Hiraishi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 136 days.

(21) Appl. No.: 17/442,800

(22) PCT Filed: Mar. 26, 2020

(86) PCT No.: PCT/JP2020/013699
§ 371 (c)(1),
(2) Date: Sep. 24, 2021

(87) PCT Pub. No.: WO2020/203657
PCT Pub. Date: Oct. 8, 2020

(65) Prior Publication Data
US 2022/0180561 A1  Jun. 9, 2022

(30) Foreign Application Priority Data

Apr. 4, 2019   (JP) .................................. 2019-072280

(51) Int. Cl.
*G06T 7/80*      (2017.01)
*G01S 7/40*      (2006.01)
(Continued)

(52) U.S. Cl.
CPC .................. *G06T 7/80* (2017.01); *G01S 7/40* (2013.01); *G01S 13/867* (2013.01);
(Continued)

(58) Field of Classification Search
None
See application file for complete search history.

(56) References Cited

U.S. PATENT DOCUMENTS

2014/0320658 A1   10/2014 Pliefke
2017/0054974 A1    2/2017 Pliefke
(Continued)

FOREIGN PATENT DOCUMENTS

CN     108779984 A     11/2018
DE   112017001322 T5    12/2018
(Continued)

OTHER PUBLICATIONS

International Search Report and Written Opinion of PCT Application No. PCT/JP2020/013699, dated Jun. 30, 2020, 10 pages of ISRWO.

*Primary Examiner* — Samuel D Fereja
(74) *Attorney, Agent, or Firm* — CHIP LAW GROUP

(57) ABSTRACT

An information processing device (100) includes a calibration execution unit (195) that performs calibration between two or more sensors which are attached at different positions and of which visual field regions at least partially overlap each other. The calibration execution unit (195) performs the calibration between the sensors in a case where a feature point that enables calibration of each of the two or more sensors is acquirable in a region in which visual fields of the two or more sensors overlap each other.

9 Claims, 7 Drawing Sheets

(51) Int. Cl.
*G01S 13/86* (2006.01)
*G01S 13/931* (2020.01)
*G06T 7/40* (2017.01)
*G06T 7/73* (2017.01)
*G06V 20/58* (2022.01)
*H04N 23/61* (2023.01)

(52) U.S. Cl.
CPC ............ *G01S 13/931* (2013.01); *G06V 20/58* (2022.01); *H04N 23/61* (2023.01); *G06T 2207/10044* (2013.01); *G06T 2207/30252* (2013.01)

(56) References Cited

U.S. PATENT DOCUMENTS

| | | | | |
|---|---|---|---|---|
| 2017/0341661 | A1* | 11/2017 | Nishiyama | ............ B60W 50/14 |
| 2019/0004178 | A1* | 1/2019 | Motoyama | ............. G01B 11/00 |
| 2019/0204425 | A1* | 7/2019 | Abari | ..................... G01S 7/497 |

FOREIGN PATENT DOCUMENTS

| | | | |
|---|---|---|---|
| JP | 2010-249613 A | 11/2010 | |
| JP | 2017-211877 A | 11/2017 | |
| JP | 2018-096715 A | 6/2018 | |
| JP | 2019-015606 A | 1/2019 | |
| WO | 2013/074604 A1 | 5/2013 | |
| WO | 2017/159382 A1 | 9/2017 | |
| WO | WO-2017159382 A1 * | 9/2017 | ............. G01B 11/00 |

\* cited by examiner

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2020/013699 filed on Mar. 26, 2020, which claims priority benefit of Japanese Patent Application No. JP 2019-072280 filed in the Japan Patent Office on Apr. 4, 2019. Each of the above-referenced applications is hereby incorporated herein by reference in its entirety.

FIELD

The present disclosure relates to an information processing device, an information processing method, and an information processing program.

BACKGROUND

In recent years, for the purpose of recognizing information necessary for automatic driving and driving assistance, a driving assistance system that uses information acquired from a plurality of in-vehicle sensors in combination has been commercialized.

In the driving assistance system described above, when the pieces of information acquired from a plurality of in-vehicle sensors are used in combination, a detection error may be included in information to be used due to a deviation in distance and azimuth between the in-vehicle sensors. In view of this point, for example, a technology of performing in-vehicle sensor calibration based on map information has been proposed.

CITATION LIST

Patent Literature

Patent Literature 1: JP 2018-96715 A

SUMMARY

Technical Problem

Since the above-described in-vehicle sensor calibration technology is based on the map information, the calibration cannot be performed in some cases. For example, the calibration cannot be performed for a region with no map information. In addition, in a case where an environment changes due to construction or the like, the calibration cannot be performed as well.

Therefore, the present disclosure proposes an information processing device, an information processing method, and an information processing program capable of performing calibration even for a region with no map information without being affected by an environment change.

Solution to Problem

To solve the above problem, an information processing device according to an embodiment of the present disclosure includes: a calibration execution unit that performs calibration between two or more sensors which are attached at different positions and of which visual field regions at least partially overlap each other, wherein the calibration execution unit performs the calibration between the sensors in a case where a feature point that enables calibration of each of the two or more sensors is acquirable in a region in which visual fields of the two or more sensors overlap each other.

DESCRIPTION OF EMBODIMENTS

Hereinafter, embodiments of the present disclosure will be described in detail with reference to the drawings. Note that in each of the following embodiments, the same reference signs denote the same portions, and an overlapping description may be omitted.

Further, the present disclosure will be described in the following order.

1. Embodiment
1-1. Outline of Information Processing According to Embodiment
1-2. Configuration of Management Device According to Embodiment
1-3. Configuration of Information Processing Device According to Embodiment
1-4. Procedure of Information Processing According to Embodiment
1-5. Modified Example According to Embodiment
2. Other Embodiments
2-1. Other Sensors
2-2. Configuration of Mobile Body
2-3. Others
3. Effects of Information Processing Device According to Present Disclosure
4. Hardware Configuration (1. Embodiment)

[1-1. Outline of Information Processing According to Embodiment]

Figure 1:
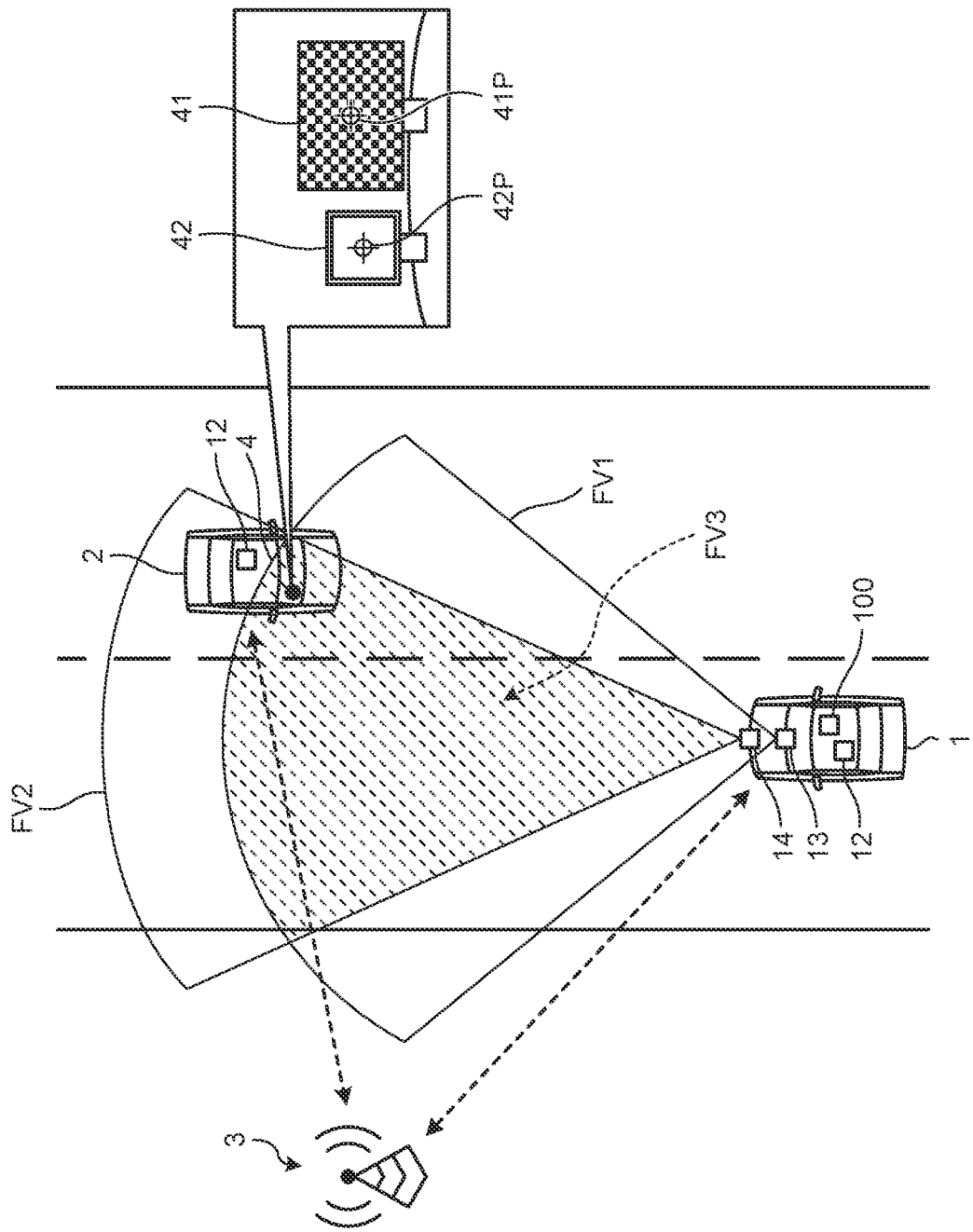
FIG. 1 is a diagram illustrating an outline of information processing according to an embodiment of the present disclosure.

FIG. 1 is a diagram illustrating an outline of information processing according to an embodiment of the present disclosure. The information processing according to the embodiment of the present disclosure relates to, for example, calibration for in-vehicle sensors mounted on a vehicle. The vehicle in the embodiment described below is, for example, an automobile. The information processing according to the embodiment is performed by an information processing device 100 mounted on an automobile.

Generally, in a driving assistance system using information acquired from a plurality of in-vehicle sensors, a detection error may be included in the information acquired from the plurality of in-vehicle sensors due to a deviation in distance and azimuth between the in-vehicle sensors.

On the other hand, for example, a technology of performing in-vehicle sensor calibration based on map information has been proposed, but since the calibration is performed based on map information, in some cases, the calibration cannot be performed when there is no map information. For example, since the calibration technology is based on the map information, the calibration cannot be performed in an automobile traveling in a region with no map information. In addition, in the calibration technology, the calibration cannot be performed also in a case where an environment change occurs due to construction or the like and a deviation occurs between an actual environment and the map information.

In this regard, a method, in which the information processing device 100 according to the embodiment performs the information processing described below to perform calibration even for a region with no map information without being affected by an environment change, is proposed. That is, the outline of the information processing performed by the information processing device 100 is to cause a specific object mounted on a vehicle to function as a feature point used for calibration between in-vehicle sensors.

The information processing device 100 is mounted on each of vehicles 1 and 2 illustrated in FIG. 1 and performs similar information processing. In the following description, a case where the information processing device 100 mounted on the vehicle 1 performs calibration between in-vehicle sensors mounted on the vehicle 1 by using feature points of a specific object (a calibration jig 4 as described below) mounted on the vehicle 2 will be described. In the following description, the vehicle 1 may be referred to as "host vehicle", and the vehicle 2 on which the specific object having feature points used for the calibration between the in-vehicle sensors mounted on the vehicle 1 is mounted may be referred to as "target vehicle".

The vehicle 1 illustrated in FIG. 1 includes a reception unit 12, an imaging unit 13 and a measurement unit 14 that function as external sensors, and the information processing device 100.

The reception unit 12 is, for example, a GPS receiver. The information processing device 100 transmits position information based on a signal received by the reception unit 12 to a management device 3.

The imaging unit 13 and the measurement unit 14 are attached at different positions on the vehicle 1. A visual field region FV1 of the imaging unit 13 and a visual field region FV2 of the measurement unit 14 form a region FV3 in which the visual field region FV1 and the visual field region FV2 at least partially overlap each other. The imaging unit 13 is, for example, a camera, and the measurement unit 14 is, for example, a millimeter wave radar. The imaging unit 13 and the measurement unit 14 are examples of two or more sensors.

The information processing device 100 transmits and receives various types of information by road-to-vehicle communication (V2X communication) performed between the information processing device 100 and the management device 3, for example. The management device 3 manages a positional relationship between the vehicle 1 and the vehicle 2 on the basis of the position information received from the vehicles 1 and 2.

In addition, the information processing device 100 acquires information regarding the target vehicle from the management device 3. In a case where the vehicle 2 is the target vehicle, the information processing device 100 can acquire information such as the position and posture of the target vehicle, the installation position and posture of the calibration jig 4 in the target vehicle, and a positional relationship between a checkerboard 41 and a corner reflector 42.

The calibration jig 4 includes the checkerboard 41 from which a feature point 41P that enables calibration for the imaging unit 13 can be extracted, and the corner reflector 42 having a feature point 42P that enables calibration for the measurement unit 14. The checkerboard 41 is installed at a position and in a direction at and in which at least an oncoming vehicle can capture an image thereof. The corner reflector 42 is installed at a position and in a direction at and in which at least radar light emitted from an oncoming vehicle can be reflected.

The information processing device 100 acquires, from the management device 3, information regarding whether or not the target vehicle having the feature points that enable calibration between the imaging unit 13 and the measurement unit 14 is present in an acquirable range around the host vehicle. Then, in a case where the feature point 41P and the feature point 42P can be acquired in the region FV3 where the visual field regions of the imaging unit 13 and the measurement unit 14 overlap each other, the information processing device 100 performs the calibration between the imaging unit 13 and the measurement unit 14.

Specifically, the information processing device 100 coordinate-transforms the installation position of the calibration jig 4 in the target vehicle on the basis of the position of the target vehicle and the installation position of the calibration jig 4 in the target vehicle, and specifies the position of the calibration jig 4 in a global coordinate system. Subsequently, the information processing device 100 determines whether or not the target vehicle is present in the region for which the calibration can be performed on the basis of information on the region FV3 where the visual field regions of the imaging unit 13 and the measurement unit 14 overlap each other and the position information of the calibration jig 4 mounted on the target vehicle. For example, when the calibration jig 4 mounted on the target vehicle is positioned in the region FV3 where the visual field regions of the imaging unit 13 and the measurement unit 14 overlap each other, the information processing device 100 determines that the target vehicle is present in the region for which the calibration can be performed.

Then, the information processing device 100 determines whether or not the feature point 41P and the feature point 42P can be acquired from the calibration jig 4 on the basis of position information and posture information of the host vehicle and position information and posture information of the target vehicle. Then, in a case where it is determined that the feature point 41P and the feature point 42P can be acquired from the calibration jig 4, the information processing device 100 acquires the feature point 41P and the feature point 42P, and performs distance and azimuth calibration between the imaging unit 13 and the measurement unit 14.

In this way, the information processing device 100 according to the embodiment can perform calibration even for a region with no map information without being affected by an environment change.

[1-2. Configuration of Management Device According to Embodiment]

Figure 2:
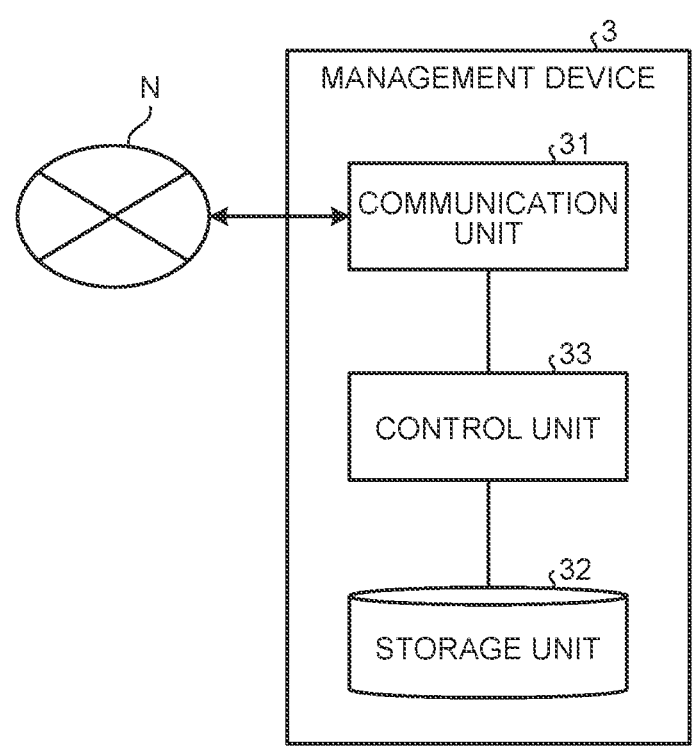
FIG. 2 is a diagram illustrating an example of a configuration of a management device according to the embodiment of the present disclosure.

A configuration of the management device 3 according to the embodiment of the present disclosure will be described with reference to FIG. 2. FIG. 2 is a diagram illustrating an example of the configuration of the management device according to the embodiment of the present disclosure. As illustrated in FIG. 2, the management device 3 includes a communication unit 31, a storage unit 32, and a control unit 33. The management device 3 manages a positional relationship of vehicles on the basis of information acquired from a roadside device such as a wireless station installed on a road.

The communication unit 31 is implemented by, for example, a network interface card (NIC) or the like. The communication unit 31 may be a wired interface or a wireless interface. The communication unit 31 may be a wireless communication interface of a wireless LAN system or a cellular communication system. The communication unit 31 is connected to a network N (the Internet or the like) in a wired or wireless manner, and transmits and receives information to and from another device such as the information processing device 100 via the network N.

The storage unit 32 is implemented by, for example, a semiconductor memory element such as a random access memory (RAM) or a flash memory, or a storage device such as a hard disk or an optical disk. The storage unit 32 stores programs that provide functions for implementing the information processing performed by the control unit 33 and various data. The storage unit 32 may function as a buffer memory when the control unit 33 performs the information processing. The storage unit 32 stores the position information of the vehicle (the vehicle 1, the vehicle 2, or the like) received from the information processing device 100.

The control unit 33 is implemented by, for example, a central processing unit (CPU), a micro processing unit (MPU), a graphics processing unit (GPU), or the like executing a program (for example, an information processing program according to the present disclosure) stored in the information processing device 100 with a random access memory (RAM) or the like as a work area. Further, the control unit 33 is a controller and may be implemented by, for example, an integrated circuit such as an application specific integrated circuit (ASIC) or a field programmable gate array (FPGA).

The control unit 33 specifies the positional relationship between the vehicles on the basis of the position information of the vehicles (the vehicle 1, the vehicle 2, and the like) received from the information processing device 100. Then, the control unit 33 transmits a notification indicating that the target vehicle is present to each of the information processing devices 100 mounted on the vehicles that are in a positional relationship in which the calibration can be performed. Examples of the positional relationship in which the calibration can be performed include a case where the distance between the vehicles is within a predetermined distance range.

In addition, the control unit 33 relays vehicle information exchanged between the vehicles on the basis of the positional relationship between the vehicles. For example, in a case where the vehicle 1 and the vehicle 2 are in a positional relationship in which the calibration can be performed, the control unit 33 transfers the vehicle information received from the vehicle 1 to the vehicle 2 and transfers the vehicle information received from the vehicle 2 to the vehicle 1.

[1-3. Configuration of Information Processing Device According to Embodiment]

Figure 3:
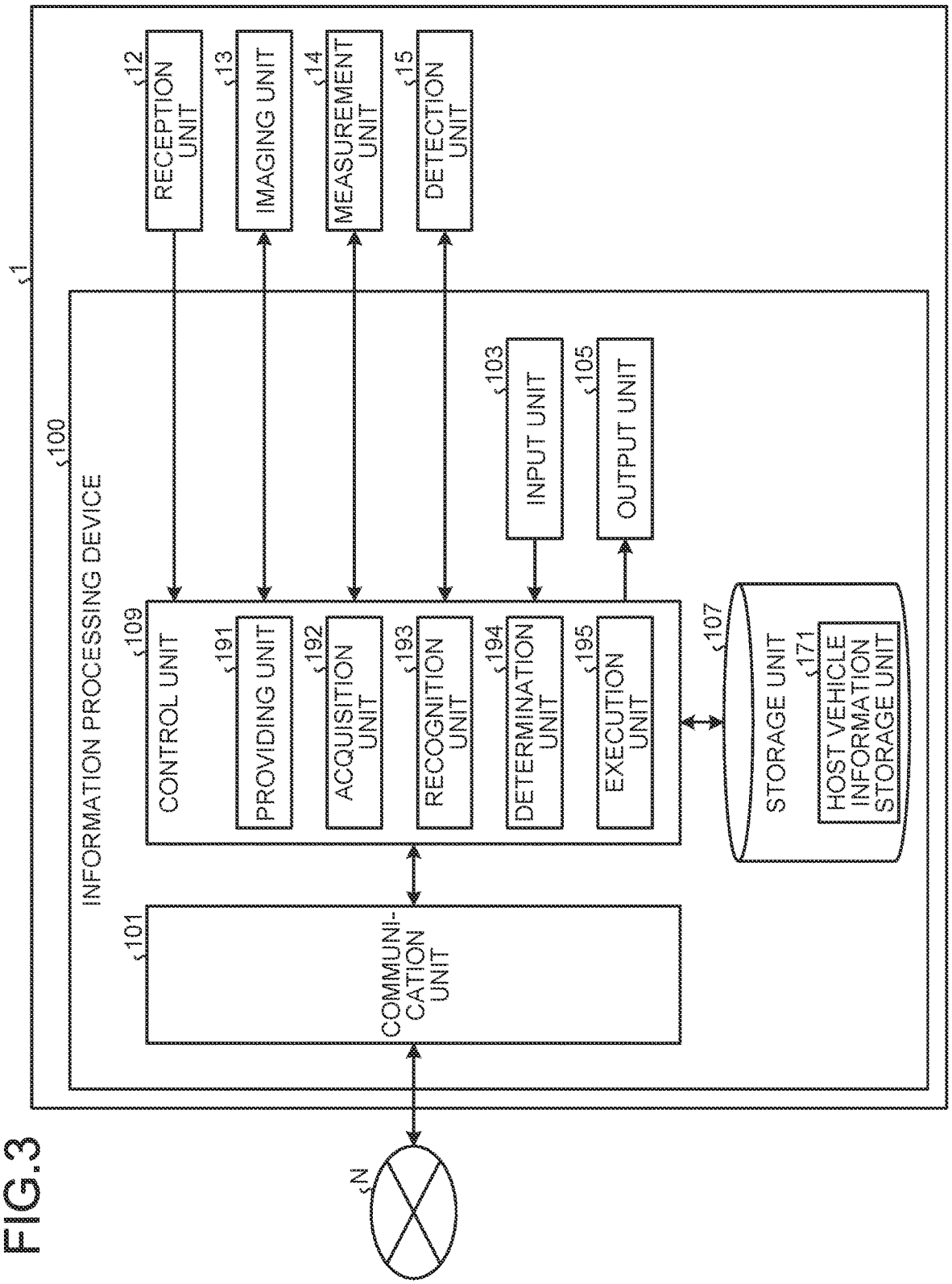
FIG. 3 is a diagram illustrating an example of a configuration of an information processing device according to the embodiment of the present disclosure.

A configuration of the information processing device 100 according to the embodiment of the present disclosure will be described with reference to FIG. 3. FIG. 3 is a diagram illustrating an example of the configuration of the information processing device 100 according to the embodiment of the present disclosure. In the following description, when the vehicle 1 and the vehicle 2 are in a positional relationship in which the calibration can be performed and what is described as the host vehicle is the vehicle 1, the vehicle 2 is the target vehicle. In contrast, in the following description, when the vehicle 1 and the vehicle 2 are in a positional relationship in which the calibration can be performed and what is described as the host vehicle is the vehicle 2, the vehicle 1 is the target vehicle. Since the vehicle 1 and the vehicle 2 have the same configuration, an example of the configuration of the vehicle 1 will be described below.

As illustrated in FIG. 3, the vehicle 1 includes the reception unit 12, the imaging unit 13, the measurement unit 14, a detection unit 15, and the information processing device 100.

The reception unit 12 receives a radio wave signal of a predetermined frequency band used for a satellite positioning system such as a global positioning system (GPS) from a GPS satellite. The reception unit 12 performs demodulation processing on the received radio wave signal, and transmits the processed signal to the information processing device 100 or the like.

The imaging unit 13 is a camera capable of capturing a moving image or a still image of a situation outside the host vehicle. The imaging unit 13 is implemented by, for example, a stereo camera, a monocular camera, or an infrared camera. The imaging unit 13 may be a camera other than the above, such as a time of flight (ToF) camera. The imaging unit 13 transmits the captured image to the information processing device 100 or the like.

The measurement unit 14 is a sensor for measuring a distance to an object around the host vehicle. The measurement unit 14 is implemented by, for example, a distance measuring system using a millimeter wave radar.

The detection unit 15 detects information indicating the state of the host vehicle. The detection unit 15 is implemented by, for example, an inertial measurement system such as an inertial measurement unit (IMU) including a vehicle speed sensor, an acceleration sensor, an angular velocity sensor, and the like. The detection unit 15 acquires, as the information indicating the state of the host vehicle, detection values such as a traveling speed of the host vehicle, an acceleration acting on the host vehicle, and an angular velocity acting on the host vehicle. The detection unit 15 transmits the information indicating the state of the host vehicle to the information processing device 100 and the like.

Returning to FIG. 3, the information processing device 100 mounted on the vehicle 1 includes a communication unit 101, an input unit 103, an output unit 105, a storage unit 107, and a control unit 109.

The communication unit 101 is implemented by, for example, a network interface card (NIC) or the like. The communication unit 101 may be a universal serial bus (USB) interface including a USB host controller, a USB port, and the like. Furthermore, the communication unit 101 may be a wired interface or a wireless interface. The communication unit 101 may be a wireless communication interface of a wireless LAN system or a cellular communication system. The communication unit 101 is connected to the network N (the Internet or the like) in a wired or wireless manner, and transmits and receives information to and from another device such as the management device 3 via the network N.

The input unit 103 is a processing unit for receiving various operations from a user or the like who uses the information processing device 100. The input unit 103 receives inputs of various types of information via, for example, a keyboard, a touch panel, or the like.

The output unit 105 is a processing unit for outputting various types of information. The output unit 105 is, for example, a display, a speaker, or the like. For example, the output unit 105 can display an image captured by the imaging unit 13.

The storage unit 107 is implemented by, for example, a semiconductor memory element such as a random access memory (RAM) or a flash memory, or a storage device such as a hard disk or an optical disk. The storage unit 107 stores programs that provide functions for implementing the information processing performed by the control unit 109 and various data. The storage unit 107 may function as a buffer memory when the control unit 109 performs the information processing.

The storage unit 107 includes a host vehicle information storage unit 171 that stores host vehicle information. The host vehicle information includes the region FV3 in which the visual field regions of the imaging unit 13 and the measurement unit 14 overlap each other, the installation position of the calibration jig 4 in the host vehicle, and information on the relative positional relationship between the imaging unit 13 and the measurement unit 14 when mounted on the vehicle.

The control unit 109 is implemented by, for example, a central processing unit (CPU), a micro processing unit (MPU), a graphics processing unit (GPU), or the like executing a program (for example, an information processing program according to the present disclosure) stored in the information processing device 100 with a random access memory (RAM) or the like as a work area. Further, the control unit 109 is a controller and may be implemented by, for example, an integrated circuit such as an application specific integrated circuit (ASIC) or a field programmable gate array (FPGA).

As illustrated in FIG. 3, the control unit 109 includes a providing unit 191, an acquisition unit 192, a recognition unit 193, a determination unit 194, and an execution unit 195, and implements or executes the function or action of the information processing as described below. Note that the internal configuration of the control unit 130 is not limited to the configuration illustrated in FIG. 3, and may be another configuration as long as the information processing as described later is performed. The determination unit 194 is an example of a determination unit, and the execution unit 195 is an example of a calibration execution unit.

The providing unit 191 periodically performs communication with the management device 3 by V2X communication (road-to-vehicle communication) and provides information regarding the host vehicle to the management device 3. The information regarding the host vehicle includes the position information and the posture information of the host vehicle, and information (host vehicle information) regarding the calibration jig 4 in the host vehicle. The position information and the posture information of the host vehicle are acquired by the recognition unit 193 to be described later.

The acquisition unit 192 receives, by V2X communication (road-to-vehicle communication), information regarding whether or not a specific object having a feature point that enables calibration between two or more sensors is present in an acquirable range around the host vehicle. For example, the acquisition unit 192 receives a notification indicating that the target vehicle is present from the management device 3. In addition, the acquisition unit 192 acquires information on the specific object having the feature point that enables the calibration of each of the two or more sensors. For example, the acquisition unit 192 can acquire information on the position and posture of the target vehicle, the installation position and posture of the calibration jig 4 in the target vehicle, and the positional relationship of the calibration jig 4 (the checkerboard 41 and the corner reflector 42).

The recognition unit 193 recognizes the position of the host vehicle on the basis of the signal acquired by the reception unit 12. Furthermore, the recognition unit 193 recognizes the posture of the host vehicle on the basis of the information detected by the detection unit 15 and acquires posture information. The posture information includes information on the traveling speed and the orientation (posture) during traveling of the host vehicle.

In a case where the specific object having the feature point is present in the acquirable range around the host vehicle, the determination unit 194 uses the target vehicle information received from the management device 3 to determine whether or not the target vehicle is present in a region for which the calibration between the imaging unit 13 and the measurement unit 14 can be performed. Specifically, the determination unit 194 coordinate-transforms the installation position of the calibration jig 4 in the target vehicle on the basis of the position information of the target vehicle and the position information of the calibration jig 4 mounted on the target vehicle, and specifies the position in the global coordinate system. Subsequently, the information processing device 100 determines whether or not the target vehicle is present in the region for which the calibration can be performed on the basis of information on the region FV3 where the visual field regions of the imaging unit 13 and the measurement unit 14 overlap each other and the position information of the calibration jig 4 mounted on the target vehicle. That is, when the calibration jig 4 mounted on the target vehicle is positioned in the region FV3 where the visual field regions of the imaging unit 13 and the measurement unit 14 overlap each other, the determination unit 194 determines that the target vehicle is present in the region for which the calibration can be performed.

Subsequently, in a case where it is determined that the target vehicle is present in the region for which the calibration can be performed, the determination unit 194 determines whether or not the feature points can be acquired from the calibration jig 4 mounted on the target vehicle. Specifically, the determination unit 194 acquires the position information and the posture information of the host vehicle and the position information and the posture information of the target vehicle. Then, the determination unit 194 determines whether or not the feature points can be acquired from the target vehicle on the basis of the position information and the posture information of the host vehicle and the position information and the posture information of the target vehicle. That is, the determination unit 194 determines whether or not the feature point 41P can be acquired from the checkerboard 41 which is the calibration jig 4 mounted on the target vehicle, and determines whether or not the feature point 42P can be acquired from the corner reflector 42.

For example, the determination unit 194 can determine whether or not the feature points can be acquired from the calibration jig 4 on the basis of the positional relationship between the host vehicle and the target vehicle, the relative speed between the host vehicle and the target vehicle, the traveling postures of the host vehicle and the target vehicle, and the like. For example, as an example of the condition under which the feature points can be acquired, the relative speed between the host vehicle and the target vehicle is a speed at which an image of the calibration jig 4 mounted on the target vehicle can be captured by the imaging unit 13 of the host vehicle. In addition, as an example of the condition under which the feature points can be acquired, the traveling postures of the host vehicle and the target vehicle are straight postures in which the feature points are relatively easily extracted from the calibration jig 4 mounted on the target vehicle.

Further, the determination unit 194 may determine that the feature points can be acquired from the target vehicle when the calibration jig 4 mounted on the target vehicle is positioned in the region FV3 in which the visual field regions of imaging unit 13 and measurement unit 14 overlap each other.

Note that the determination unit 194 can also use the position information and the posture information of the imaging unit 13 and the measurement unit 14 installed in the host vehicle, instead of the position information and the posture information of the host vehicle. The determination unit 194 can also use the position information and the posture information of the calibration jig 4 mounted on the target vehicle as the position information and the posture information of the target vehicle.

In a case where the determination unit 194 determines that the feature points can be acquired from the calibration jig 4 mounted on the target vehicle, the execution unit 195 performs calibration between sensors (the calibration between the imaging unit 13 and the measurement unit 14 mounted on the host vehicle). That is, the execution unit 195 performs the calibration between the imaging unit 13 and the measurement unit 14 so as to maintain the relative positional relationship between the imaging unit 13 and the measurement unit 14 when mounted on the vehicle.

Specifically, the execution unit 195 recognizes an image captured by the imaging unit 13, and acquires the feature point that enables the calibration of each of the imaging unit 13 (camera) and the measurement unit 14 (millimeter wave radar) from the captured image. That is, the execution unit 195 acquires the feature point 41P from the checkerboard 41 which is the calibration jig 4 mounted on the target vehicle, and acquires the feature point 42P from the corner reflector 42.

Subsequently, the execution unit 195 recognizes the current relative positional relationship between the imaging unit 13 and the measurement unit 14 on the basis of the positional relationship between the feature point 41P and the feature point P42 acquired from the captured image. Subsequently, the execution unit 195 acquires information on the relative positional relationship between the imaging unit 13 and the measurement unit 14 when mounted on the vehicle from the host vehicle information storage unit 171. Subsequently, the execution unit 195 computes a deviation between the current relative positional relationship between the imaging unit 13 and the measurement unit 14 and the relative positional relationship between the imaging unit 13 and the measurement unit 14 when mounted on the vehicle. Then, the execution unit 195 transmits a control signal to an actuator for adjusting the attachment position and the attachment angle of the imaging unit 13 to absorb the deviation from the relative positional relationship between the imaging unit 13 and the measurement unit 14 when mounted on the vehicle. In this manner, the execution unit 195 performs the calibration between the imaging unit 13 and the measurement unit 14 so that the relative positional relationship between the imaging unit 13 and the measurement unit 14 approaches the optimum state when mounted on the vehicle.

Even when individual sensors are displaced from positions at the time of shipment (at the time of installation in the vehicle) as the vehicle travels, the imaging unit 13 and the measurement unit 14 can function as sensors as long as the relative positional relationship between the sensors is maintained by the calibration between the sensors performed by the execution unit 195. That is, when the traveling direction (facing direction) of the host vehicle can be acquired from the GPS signal received by the reception unit 12 or the detection result of the detection unit 15, and the relative positional relationship can be converted to the coordinate system around the host vehicle, the imaging unit 13 and the measurement unit 14 can function as sensors. Note that, in order to know the traveling directions of other vehicles, each vehicle needs to obtain the traveling direction from the same reference system such as a geographic coordinate system from a dual antenna GPS or the like.

[1-4. Procedure of Information Processing According to Embodiment]

Figure 4:
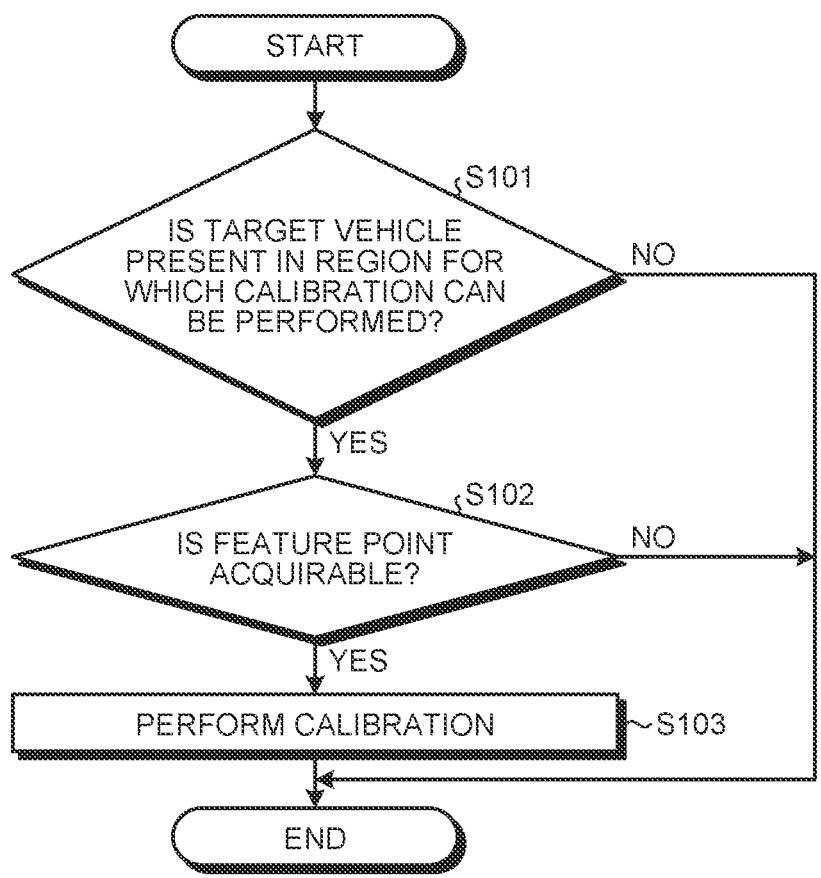
FIG. 4 is a flowchart illustrating a flow of the information processing according to the embodiment of the present disclosure.

A procedure of the information processing according to the embodiment of the present disclosure will be described with reference to FIG. 4. FIG. 4 is a flowchart illustrating a flow of the information processing according to the embodiment of the present disclosure. The processing illustrated in FIG. 4 is performed by each unit included in the control unit 109, for example. The processing illustrated in FIG. 4 is repeatedly performed during the traveling of the host vehicle.

As illustrated in FIG. 4, the determination unit 194 determines whether or not the target vehicle is present in a region for which the calibration can be performed (Step S101).

Specifically, when the installation position of the calibration jig 4 mounted on the target vehicle is included in the region FV3 in which the visual field regions of the imaging unit 13 and the measurement unit 14 overlap each other, the determination unit 194 determines that the target vehicle is present in the region for which the calibration can be performed.

In a case where it is determined that the target vehicle is present in the region for which the calibration can be performed (Step S101; Yes), the determination unit 194 determines whether or not the feature points can be acquired from the calibration jig 4 mounted on the target vehicle (Step S102).

Specifically, the determination unit 194 determines whether or not the feature points can be acquired from the calibration jig 4 mounted on the target vehicle on the basis of the position information and the posture information of the host vehicle and the position information and the posture information of the target vehicle. As examples of the condition under which the feature points can be acquired, the relative speed is a speed at which an image of the calibration jig 4 mounted on the target vehicle can be captured by the host vehicle (imaging unit 13) and the traveling postures of the host vehicle and the target vehicle are straight postures.

In a case where the determination unit determines that the feature points can be acquired (Step S103; Yes), the execution unit 195 acquires the feature points from the calibration jig 4 mounted on the target vehicle, performs the calibration (Step S107), and ends the processing illustrated in FIG. 4.

In a case where the determination unit 194 determines in Step S103 that the feature points cannot be acquired (Step S103; No), the execution unit 195 ends the processing illustrated in FIG. 4 without performing the calibration.

In a case where the determination unit 194 determines in Step S101 that the target vehicle is not present in the region for which the calibration can be performed (Step S101; No), the processing illustrated in FIG. 4 ends.

[1-5. Modified Example According to Embodiment]

In the above-described embodiment, an example in which the information processing device 100 acquires various types of information regarding the target vehicle by road-to-vehicle communication (V2X communication) via the management device 3 has been described, but the present disclosure is not particularly limited to this example. The information processing device 100 may acquire various types of information regarding the target vehicle by performing vehicle-to-vehicle communication with the target vehicle.

Furthermore, in the above-described embodiment, an example in which calibration between different types of sensors, the imaging unit 13 (camera) and the measurement unit 14 (millimeter wave radar), is performed as the information processing performed by the information processing device 100 has been described. However, the present disclosure is not particularly limited to this example, and the information processing performed by the information processing device 100 can be similarly applied to a case where calibration between the same type of sensors is performed.

In addition, in the above-described embodiment, it is desirable that the vehicle 1 travels near the center of a traveling lane when performing the calibration.

In addition, in the above-described embodiment, the feature point used for calibration between sensors is not necessarily the calibration jig 4 installed in the target vehicle for calibration, and it is sufficient that any feature point that enables calibration can be extracted. For example, the feature point may be an existing structure in a vehicle, such as a tail lamp.

Furthermore, in the above-described embodiment, an example in which the information processing device 100 performs calibration (calibration between sensors) using a captured image of another mobile body (for example, the target vehicle) has been described. The processing performed by the information processing device 100 can be similarly applied to a case where calibration of one sensor is performed using a captured image of another mobile body (for example, the target vehicle).

(2. Other Embodiments)

[2-1. Other Sensors]

An example in which the information processing device 100 according to the above-described embodiment includes, for example, a millimeter wave radar as the measurement unit 14 has been described, but the present disclosure is not particularly limited to this example. The information processing device 100 may include a light detection and ranging (laser imaging detection and ranging (LiDAR)) that reads a three-dimensional structure of a surrounding environment of the host vehicle. The LiDAR detects the distance and the relative speed to a surrounding object by irradiating the surrounding object with a laser beam such as an infrared laser beam and measuring a time until the laser beam is reflected and returned. The information processing device 100 can perform calibration between LiDARs by using information on the target vehicle acquired by the LiDARs as the feature point.

Figure 5:
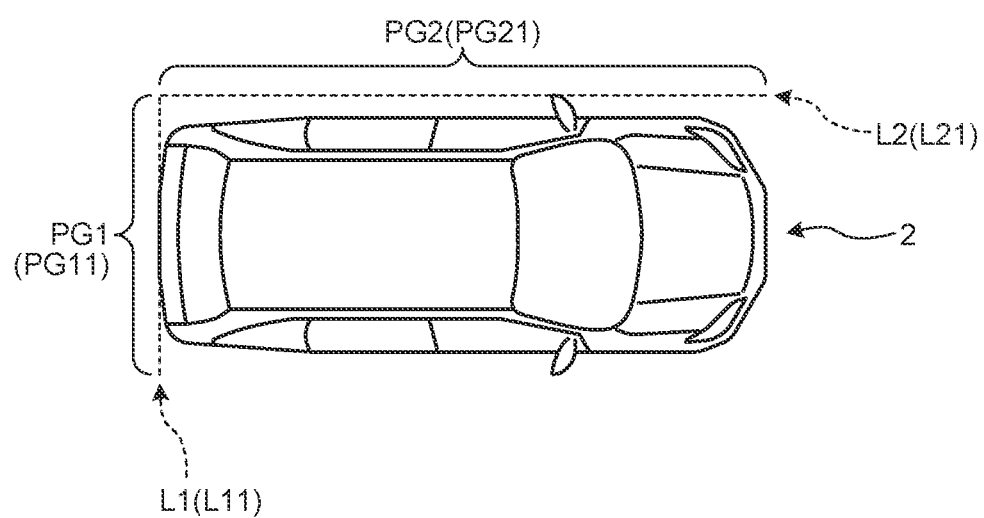
FIG. 5 is a diagram illustrating an example of detection performed by LiDAR.

FIG. 5 is a diagram illustrating an example of detection performed by the LiDAR. As illustrated in FIG. 5, for example, it is assumed that two LiDARs, LiDAR_EX1 and LiDAR_EX2, are mounted on the vehicle 1. At this time, the LiDAR_EX1 mounted on the vehicle 1 detects detection point groups PG1 and PG2 indicating the outer shape of the vehicle 2 that is the target vehicle. Similarly, the LiDAR_EX2 mounted on the vehicle 1 detects detection point groups PG11 and PG21 indicating the outer shape of the vehicle 2 that is the target vehicle.

Then, the information processing device 100 performs calibration between the LiDARs on the basis of information acquired from the two LiDARs, the LiDAR_EX1 and the LiDAR_EX2. For example, the information processing device 100 adjusts the attachment position and the attachment angle of the LiDARs so that two straight lines L1 and L2 formed by the detection point groups PG1 and PG2 and two straight lines L11 and L21 formed by the detection point groups PG11 and PG21 overlap each other. In this manner, the information processing device 100 can perform the calibration between the LiDARs on the basis of the target vehicle information acquired by the LiDARs without requiring an additional feature point such as a calibration jig.

[2-2. Configuration of Mobile Body]

Furthermore, in the above-described embodiment, an example in which the information processing device 100 is mounted on a vehicle (automobile) has been described. However, the information processing implemented by the information processing device 100 may be performed by a mobile body itself such as a vehicle (automobile) that performs automatic driving. In this case, the information processing device 100 may have the following configuration in addition to the configuration illustrated in FIG. 2. Note that each unit described below may be included in the configuration illustrated in FIG. 2, for example.

Figure 6:
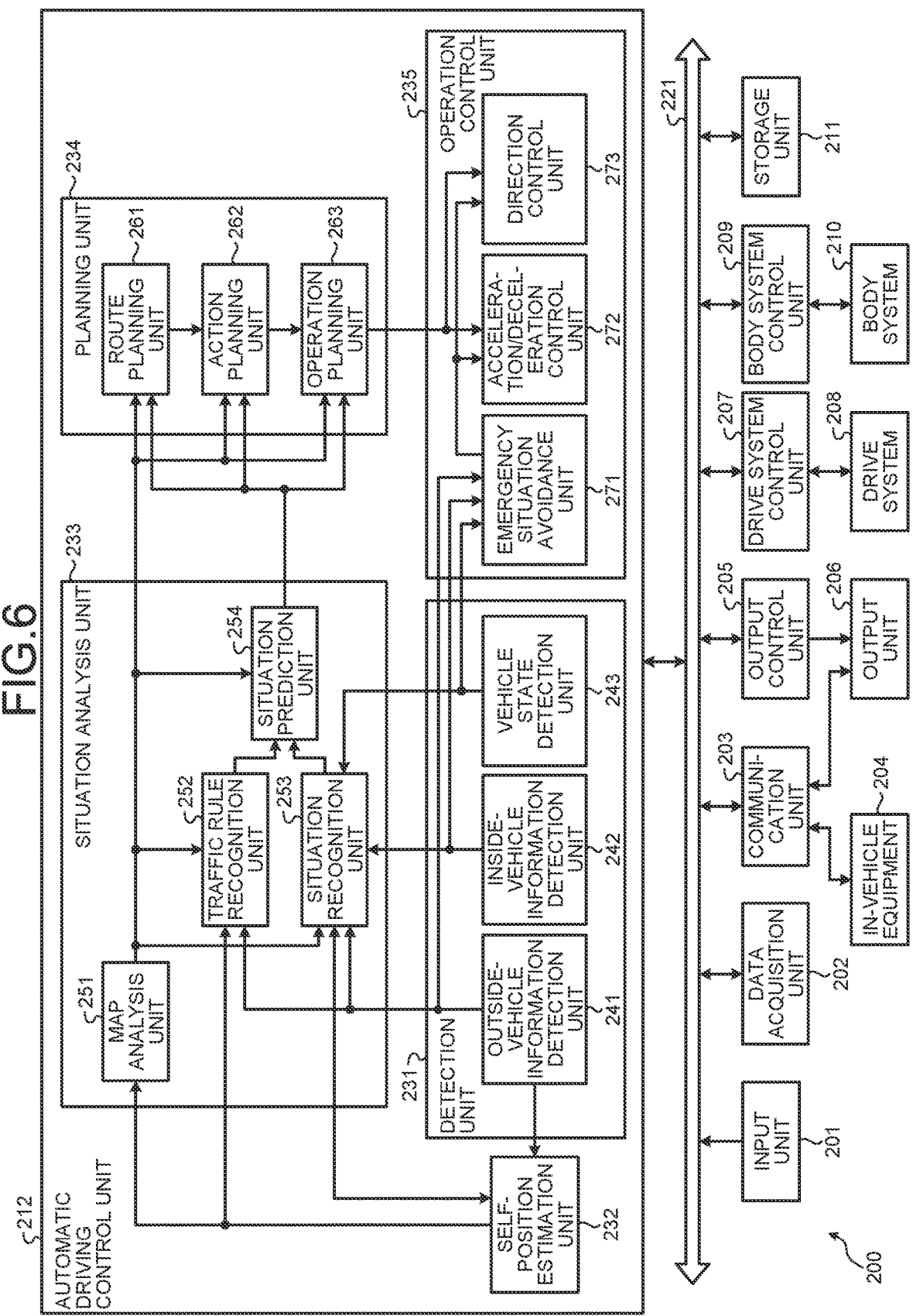
FIG. 6 is a block diagram illustrating a configuration example of schematic functions of a mobile body control system to which the information processing according to the embodiment of the present disclosure can be applied.

That is, the information processing device 100 according to the embodiment of the present disclosure can be configured as a mobile body control system as described below. FIG. 6 is a block diagram illustrating a configuration example of schematic functions of the mobile body control system to which the information processing according to the embodiment of the present disclosure can be applied.

An automatic driving control unit 212 of a vehicle control system 200 which is an example of the mobile body control system corresponds to the control unit 109 of the information processing device 100 of the embodiment. Furthermore, a detection unit 231 and a self-position estimation unit 232 of the automatic driving control unit 212 correspond to the recognition unit 193 of the control unit 109 of the information processing device 100 according to the embodiment. In addition, a situation analysis unit 233 of the automatic driving control unit 212 corresponds to the recognition unit 193 of the control unit 109. Furthermore, a planning unit 234 of the automatic driving control unit 212 corresponds to the determination unit 194 and the execution unit 195 of the control unit 109. An operation control unit 235 of the automatic driving control unit 212 corresponds to the determination unit 194 and the execution unit 195 of the control unit 109. Further, the automatic driving control unit 212 may include blocks corresponding to the respective processing units of the control unit 130, in addition to the blocks illustrated in FIG. 6.

Note that, hereinafter, a vehicle in which the vehicle control system 200 is provided is referred to as a host vehicle to distinguish it from other vehicles.

The vehicle control system 200 includes an input unit 201, a data acquisition unit 202, a communication unit 203, an in-vehicle equipment 204, an output control unit 205, an output unit 206, a drive system control unit 207, a drive system 208, a body system control unit 209, a body system 210, a storage unit 211, and an automatic driving control unit 212. The input unit 201, the data acquisition unit 202, the communication unit 203, the output control unit 205, the drive system control unit 207, the body system control unit 209, the storage unit 211, and the automatic driving control unit 212 are connected to one another via a communication network 221. Examples of the communication network 221 include an in-vehicle communication network, a bus, or the like according to any standard such as a controller area network (CAN), a local interconnect network (LIN), a local area network (LAN), or FlexRay (registered trademark). Note that the respective components of the vehicle control system 200 may be directly connected to one another without going through the communication network 221.

Note that, hereinafter, when the respective components of the vehicle control system 200 are perform communication with one another via the communication network 221, a description of the communication network 221 will be omitted. For example, in a case where the input unit 201 and the automatic driving control unit 212 perform communication with each other via the communication network 221, it is simply described that the input unit 201 and the automatic driving control unit 212 perform communication with each other.

The input unit 201 includes a device used by a passenger to input various data, instructions, and the like. For example, the input unit 201 includes an operation device such as a touch panel, a button, a microphone, a switch, or a lever, and an operation device capable of receiving an input by a method other than manual operation, for example, by voice or gesture. Further, for example, the input unit 201 may be a remote control device using infrared rays or other radio waves, or externally connected equipment such as mobile equipment or wearable equipment corresponding to the operation of the vehicle control system 200. The input unit 201 generates an input signal on the basis of data, instructions, or the like input by the passenger, and supplies the input signal to each component of the vehicle control system 200.

The data acquisition unit 202 includes various sensors and the like that acquire data used for processing performed by the vehicle control system 200, and supplies the acquired data to each component of the vehicle control system 200.

For example, the data acquisition unit 202 includes various sensors for detecting the state of the host vehicle and the like. Specifically, for example, the data acquisition unit 202 includes a gyro sensor, an acceleration sensor, an inertial measurement unit (IMU), a sensor for detecting an accelerator pedal operation amount, a brake pedal operation amount, a steering wheel steering angle, and an engine speed, a motor rotation speed, a wheel rotation speed, or the like.

Further, for example, the data acquisition unit 202 includes various sensors for detecting information on the outside of the host vehicle. Specifically, for example, the data acquisition unit 202 includes an imaging device such as a time of flight (ToF) camera, a stereo camera, a monocular camera, an infrared camera, or other cameras. Further, for example, the data acquisition unit 202 includes an environment sensor for detecting a weather or climate, and a surrounding information detection sensor for detecting an object around the host vehicle. The environment sensor includes, for example, a raindrop sensor, a fog sensor, a sunshine sensor, a snow sensor, and the like. The surrounding information detection sensor includes, for example, an ultrasonic sensor, a radar, a light detection and ranging (laser imaging detection and ranging (LiDAR)), a sonar, and the like.

Further, for example, the data acquisition unit 202 includes various sensors for detecting a current position of the host vehicle. Specifically, for example, the data acquisition unit 202 includes a global navigation satellite system (GNSS) receiver that receives a GNSS signal from a GNSS satellite, or the like.

Further, for example, the data acquisition unit 202 includes various sensors for detecting information on the inside of the vehicle. Specifically, for example, the data acquisition unit 202 includes an imaging device that captures an image of the driver, a biosensor that detects biological information of the driver, a microphone that collects sound in a vehicle compartment, and the like. The biosensor is provided on, for example, a surface of a seat or a steering wheel, and detects biological information of a passenger sitting on the seat or a driver holding the steering wheel.

The communication unit 203 performs communication with the in-vehicle equipment 204 and various equipment, servers, base stations, and the like outside the vehicle, transmits data supplied from each component of the vehicle control system 200, and transmits the received data to each component of the vehicle control system 200. Note that a communication protocol supported by the communication unit 203 is not particularly limited, and the communication unit 203 may support a plurality of types of communication protocols.

For example, the communication unit 203 performs wireless communication with the in-vehicle equipment 204 by using a wireless LAN, Bluetooth (registered trademark), near field communication (NFC), a wireless USB (WUSB), or the like. Further, for example, the communication unit 203 performs wired communication with the in-vehicle equipment 204 by using a universal serial bus (USB), a high-definition multimedia interface (HDMI) (registered trademark), a mobile high-definition link (MHL), or the like via a connection terminal (not illustrated) (and a cable, as necessary).

Further, for example, the communication unit 203 performs communication with equipment (for example, an application server or control server) existing on an external network (for example, the Internet, a cloud network, or a network unique to a business operator) via a base station or access point. Further, for example, the communication unit 203 uses a peer to peer (P2P) technology to perform communication with a terminal (for example, a pedestrian, a store terminal, or a machine type communication (MTC) terminal) existing in the vicinity of the host vehicle. Further, for example, the communication unit 203 performs V2X communication such as vehicle-to-vehicle communication, vehicle-to-infrastructure communication, vehicle-to-home communication, and vehicle-to-pedestrian communication. Further, for example, the communication unit 203 includes a beacon receiving unit, receives radio waves or electromagnetic waves transmitted from a wireless station or the like installed on the road, and acquires information such as a current position, traffic congestion, traffic regulation, or a time required.

The in-vehicle equipment 204 includes, for example, mobile equipment or wearable equipment of a passenger, information equipment carried in or attached to the host vehicle, and a navigation device for searching for a route to an arbitrary destination.

The output control unit 205 controls the output of various information to the passenger of the host vehicle or the outside of the vehicle. For example, the output control unit 205 generates an output signal including at least one of visual information (for example, image data) and auditory information (for example, audio data) and supplies the generated output signal to the output unit 206 to control the output of the visual information and auditory information from the output unit 206. Specifically, for example, the output control unit 205 combines image data captured by different imaging devices of the data acquisition unit 202 to generate a bird's eye view image, a panoramic image, or the like, and supplies an output signal including the generated image to the output unit 206. Further, for example, the output control unit 205 generates audio data including a warning sound, warning message, of the like for dangers such as collision, contact, and entry into a danger zone, and supplies an output signal including the generated audio data to the output unit 206.

The output unit 206 includes a device capable of outputting visual information or auditory information to the passenger of the host vehicle or the outside of the vehicle. For example, the output unit 206 includes a display device, an instrument panel, an audio speaker, a headphone, a wearable device such as a spectacle-type display worn by a passenger, a projector, a lamp, and the like. The display device included in the output unit 206 may be a device that displays visual information in a driver's field of view, such as a head-up display, a transmissive display, and a device having an augmented reality (AR) display function, in addition to a device having a normal display.

The drive system control unit 207 generates various control signals and supplies the generated control signals to the drive system 208 to control the drive system 208. Further, the drive system control unit 207 supplies a control signal to each component other than the drive system 208 as necessary, and makes a notification of a control state of the drive system 208, and the like.

The drive system 208 includes various devices related to a drive system of the host vehicle. For example, the drive system 208 includes a drive force generation device for generating a drive force of an internal combustion engine, a drive motor, or the like, a drive force transfer mechanism for transferring the drive force to wheels, a steering mechanism for adjusting a steering angle, a braking device that generates a braking force, an antilock brake system (ABS), an electronic stability control (ESC), an electric power steering device, and the like.

The body system control unit 209 generates various control signals and supplies the control signals to the body system 210 to control the body system 210. Further, the body system control unit 209 supplies a control signal to each component other than the body system 210 as necessary, and makes a notification of a control state of the body system 210, and the like.

The body system 210 includes various devices of a body system mounted on a vehicle body. For example, the body system 210 includes a keyless entry system, a smart key system, a power window device, a power seat, a steering wheel, an air conditioning device, various lamps (for example, a headlamp, a back lamp, a brake lamp, a turn indicator, and a fog lamp), and the like.

The storage unit 211 includes, for example, a magnetic storage device such as a read only memory (ROM), a random access memory (RAM), or a hard disc drive (HDD), a semiconductor storage device, an optical storage device, an optical magnetic storage device, and the like. The storage unit 211 stores various programs, data, and the like used by each component of the vehicle control system 200. For example, the storage unit 211 stores map data such as a three-dimensional high-precision map such as a dynamic map, a global map which is less accurate than the high-precision map and covers a wide area, and a local map including information on the surrounding of the host vehicle.

The automatic driving control unit 212 performs a control related to automatic driving, such as autonomous driving or driving assistance. Specifically, for example, the automatic driving control unit 212 performs a cooperative control for the purpose of implementing functions of an advanced driver assistance system (ADAS) that include collision avoidance or shock mitigation for the host vehicle, following driving based on an inter-vehicle distance, vehicle speed maintaining driving, a warning of collision of the host vehicle, a warning of deviation of the host vehicle from a lane, or the like. Further, for example, the automatic driving control unit 212 performs a cooperative control for the purpose of automatic driving in which the host vehicle autonomously travels without depending on the operation of the driver. The automatic driving control unit 212 includes the detection unit 231, the self-position estimation unit 232, the situation analysis unit 233, the planning unit 234, and the operation control unit 235.

The detection unit 231 detects various information necessary for controlling the automatic driving. The detection unit 231 includes an outside-vehicle information detection unit 241, an inside-vehicle information detection unit 242, and a vehicle state detection unit 243.

The outside-vehicle information detection unit 241 performs processing of detecting information on the outside of the host vehicle on the basis of data or a signal from each component of the vehicle control system 200. For example, the outside-vehicle information detection unit 241 performs detection processing, recognition processing, and tracking processing for an object around the host vehicle, and processing of detecting a distance to the object. Examples of the object to be detected include a vehicle, a person, an obstacle, a structure, a road, a traffic light, a traffic sign, and a road marking. Further, for example, the outside-vehicle information detection unit 241 performs processing of detecting the surrounding environment of the host vehicle. Examples of the surrounding environment to be detected include weather, a temperature, a humidity, a brightness, and a road surface condition. The outside-vehicle information detection unit 241 supplies data indicating a result of the detection processing to the self-position estimation unit 232, a map analysis unit 251, a traffic rule recognition unit 252, and a situation recognition unit 253 of the situation analysis unit 233, an emergency situation avoidance unit 271 of the operation control unit 235, and the like.

The inside-vehicle information detection unit 242 performs processing of detecting information on the inside of the vehicle on the basis of data or a signal from each component of the vehicle control system 200. For example, the inside-vehicle information detection unit 242 performs authentication processing and recognition processing for a driver, processing of detecting a state of the driver, processing of detecting a passenger, processing of detecting a vehicle interior environment, and the like. Examples of the state of the driver to be detected include a physical condition, an alertness level, a concentration level, a degree of fatigue, a gaze direction, and the like. Examples of the vehicle interior environment to be detected include a temperature, a humidity, a brightness, an odor, and the like. The inside-vehicle information detection unit 242 supplies data indicating a result of the detection processing to the situation recognition unit 253 of the situation analysis unit 233, the emergency situation avoidance unit 271 of the operation control unit 235, and the like.

The vehicle state detection unit 243 performs the processing of detecting the state of the host vehicle on the basis of data or a signal from each component of the vehicle control system 200. Examples of the state of the host vehicle to be detected include a speed, an acceleration, a steering angle, a presence/absence and content of an abnormality, a driving operation state, a position/tilt of a power seat, a door lock state, and a state of other in-vehicle equipment. The vehicle state detection unit 243 supplies data indicating a result of the detection processing to the situation recognition unit 253 of the situation analysis unit 233, the emergency situation avoidance unit 271 of the operation control unit 235, and the like.

The self-position estimation unit 232 performs processing of estimating a position, posture, and the like of the host vehicle on the basis of data or a signal from each component of the vehicle control system 200 such as the outside-vehicle information detection unit 241 or the situation recognition unit 253 of the situation analysis unit 233. In addition, the self-position estimation unit 232 generates a local map (hereinafter, referred to as a self-position estimation map) used for self-position estimation, as necessary. The self-position estimation map is, for example, a high-precision map using a technology such as simultaneous localization and mapping (SLAM). The self-position estimation unit 232 supplies data indicating a result of the estimation processing to the map analysis unit 251, the traffic rule recognition unit 252, and the situation recognition unit 253 of the situation analysis unit 233, and the like. Further, the self-position estimation unit 232 stores the self-position estimation map in the storage unit 211.

The situation analysis unit 233 performs processing of analyzing the host vehicle and the surrounding situation. The situation analysis unit 233 includes the map analysis unit 251, the traffic rule recognition unit 252, the situation recognition unit 253, and a situation prediction unit 254.

The map analysis unit 251 performs processing of analyzing various maps stored in the storage unit 211 to build a map containing information necessary for processing for automatic driving, while using data or a signal from each component of the vehicle control system 200, such as the self-position estimation unit 232 and the outside-vehicle information detection unit 241 as necessary. The map analysis unit 251 supplies the built map to, for example, the traffic rule recognition unit 252, the situation recognition unit 253, the situation prediction unit 254, and a route planning unit 261, an action planning unit 262, and an operation planning unit 263 of the planning unit 234.

The traffic rule recognition unit 252 performs processing of recognizing a traffic rule in an area around the host vehicle on the basis of data or a signal from each component of the vehicle control system 200, such as the self-position estimation unit 232, the outside-vehicle information detection unit 241, and the map analysis unit 251. By this recognition processing, for example, a position and state of a signal around the host vehicle, a content of the traffic rule in the area around the host vehicle, a lane in which the vehicle can travel, and the like, are recognized. The traffic rule recognition unit 252 supplies data indicating a result of the recognition processing to the situation prediction unit 254 and the like.

The situation recognition unit 253 performs situation recognition processing for the host vehicle on the basis of data or a signal from each component of the vehicle control system 200, such as the self-position estimation unit 232, the outside-vehicle information detection unit 241, the inside-vehicle information detection unit 242, the vehicle state detection unit 243, and the map analysis unit 251. For example, the situation recognition unit 253 performs processing of recognizing the situation of the host vehicle, the situation in the area around the host vehicle, the situation of the driver of the host vehicle, and the like. In addition, the situation recognition unit 253 generates a local map (hereinafter, referred to as a situation recognition map) used for recognizing the situation in the area around the host vehicle, as necessary. The situation recognition map is, for example, an occupancy grid map.

Examples of the situation of the host vehicle to be recognized include a position, posture, and movement (for example, a speed, an acceleration, or a moving direction) of the host vehicle, and the presence/absence and content of an abnormality. Examples of the situation in the area around the host vehicle to be recognized include a type and position of a surrounding stationary object, a type, position, and movement of a surrounding moving object (for example, a speed, an acceleration, or a moving direction), a configuration of a surrounding road, a road surface condition, and weather, a temperature, a humidity, a brightness, and the like of the area around the host vehicle. Examples of the state of the driver to be recognized include a physical condition, an alertness level, a concentration level, a degree of fatigue, a gaze movement, a driving operation, and the like.

The situation recognition unit 253 supplies data indicating a result of the recognition processing (including a situation recognition map, as necessary) to the self-position estimation unit 232, the situation prediction unit 254, and the like. Further, the situation recognition unit 253 stores the situation recognition map in the storage unit 211.

The situation prediction unit 254 performs situation prediction processing for the host vehicle on the basis of data or a signal from each component of the vehicle control system 200, such as the map analysis unit 251, the traffic rule recognition unit 252, and the situation recognition unit 253. For example, the situation prediction unit 254 performs processing of predicting the situation of the host vehicle, the situation in the area around the host vehicle, the situation of the driver, and the like.

Examples of the situation of the host vehicle to be predicted include a behavior of the host vehicle, an occurrence of an abnormality, a distance that the host vehicle can travel, and the like. Examples of the situation in the area around the host vehicle to be predicted include a behavior of a moving object around the host vehicle, a change in signal state, an environment change such as weather, and the like. Examples of the situation of the driver to be predicted include a behavior and physical condition of the driver, and the like.

The situation prediction unit 254 supplies, to the route planning unit 261, the action planning unit 262, and the operation planning unit 263 of the planning unit 234, and the like, data indicating a result of the prediction processing together with data from the traffic rule recognition unit 252 and the situation recognition unit 253.

The route planning unit 261 plans a route to a destination on the basis of data or a signal from each component of the vehicle control system 200 such as the map analysis unit 251 and the situation prediction unit 254. For example, the route planning unit 261 sets a route from a current position to a specified destination on the basis of a global map. Further, for example, the route planning unit 261 changes the route as appropriate on the basis of a situation such as traffic congestion, an accident, traffic regulation, or construction, and the physical condition of the driver. The route planning unit 261 supplies data indicating the planned route to the action planning unit 262 and the like.

The action planning unit 262 plans an action of the host vehicle for safe traveling along the route planned by the route planning unit 261 within a planned time, on the basis of data or a signal from each component of the vehicle control system 200 such as the map analysis unit 251 and the situation prediction unit 254. For example, the action planning unit 262 plans starting, stopping, a traveling direction (for example, forward, backward, left turn, right turn, and turning), a traveling lane, a traveling speed, overtaking, and the like. The action planning unit 262 supplies data indicating the planned action of the host vehicle to the operation planning unit 263 and the like.

The operation planning unit 263 plans the operation of the host vehicle for implementing the action planned by the action planning unit 262, on the basis of data or a signal from each component of the vehicle control system 200 such as the map analysis unit 251 and the situation prediction unit 254. For example, the operation planning unit 263 plans acceleration, deceleration, a traveling track, and the like. The operation planning unit 263 supplies data indicating the planned operation of the host vehicle to an acceleration/deceleration control unit 272 and a direction control unit 273 of the operation control unit 235.

The operation control unit 235 controls the operation of the host vehicle. The operation control unit 235 includes the emergency situation avoidance unit 271, the acceleration/deceleration control unit 272, and the direction control unit 273.

The emergency situation avoidance unit 271 performs processing of detecting an emergency situation such as collision, contact, entry into a danger zone, a driver abnormality, or a vehicle abnormality on the basis of detection results of the outside-vehicle information detection unit 241, the inside-vehicle information detection unit 242, and the vehicle state detection unit 243. When an occurrence of the emergency situation is detected, the emergency situation avoidance unit 271 plans the operation of the host vehicle to avoid the emergency situation, such as a sudden stop or a sharp turn. The emergency situation avoidance unit 271 supplies data indicating the planned operation of the host vehicle to the acceleration/deceleration control unit 272, the direction control unit 273, and the like.

The acceleration/deceleration control unit 272 performs an acceleration/deceleration control for implementing the operation of the host vehicle planned by the operation planning unit 263 or the emergency situation avoidance unit 271. For example, the acceleration/deceleration control unit 272 calculates a target control value of a drive force generation device or a braking device for implementing planned acceleration, deceleration, or sudden stop, and supplies, to the drive system control unit 207, a control command indicating the calculated target control value.

The direction control unit 273 performs a direction control for implementing the operation of the host vehicle planned by the operation planning unit 263 or the emergency situation avoidance unit 271. For example, the direction control unit 273 calculates a target control value of a steering mechanism for implementing the traveling track or sharp turn planned by the operation planning unit 263 or the emergency situation avoidance unit 271, and supplies, to the drive system control unit 207, a control command indicating the calculated target control value.

[2-3. Others]

Further, among the respective processing described in the above-described embodiment, all or some of the processing described as being automatically performed can be manually performed. Alternatively, all or some of the processing described as being manually performed can be automatically performed by a known method. In addition, the processing procedures, specific names, information including various data and parameters illustrated in the specification and drawings can be arbitrarily changed unless otherwise specified. For example, various information illustrated in each drawing is not limited to the illustrated information.

Further, each illustrated component of each device is functionally conceptual, and does not necessarily have to be configured physically as illustrated in the drawings. That is, the specific modes of distribution/integration of the respective devices are not limited to those illustrated in the drawings. All or some of the devices can be functionally or physically distributed/integrated in any arbitrary unit, depending on various loads or the status of use. For example, the determination unit 194 and the execution unit 195 illustrated in FIG. 2 may be functionally or physically integrated. Furthermore, the respective units (the providing unit 191, the acquisition unit 192, the recognition unit 193, the determination unit 194, and the execution unit 195) included in the control unit 109 illustrated in FIG. 2 may be functionally or physically integrated into one unit. Furthermore, the information processing performed by the information processing device 100 of the present disclosure may be performed by the management device 3.

In addition, the above-described embodiment and modified example can be appropriately combined as long as the processing contents do not contradict each other. Furthermore, in the above-described embodiment, an automobile has been exemplified as the mobile body, but the information processing performed by the information processing device 100 of the present disclosure can also be applied to a mobile body other than an automobile. For example, the mobile body may be a small vehicle such as a motorcycle or a motor tricycle, a large vehicle such as a bus or a truck, or an autonomous mobile body such as a robot or a drone. Furthermore, the information processing device 100 is not necessarily integrated with the mobile body, and may be a cloud server or the like that acquires information from the mobile body via the network N and performs information processing on the basis of the acquired information.

Further, the effects in each embodiment described in the present specification are merely examples. The effects of the present disclosure are not limited thereto, and other effects may be obtained.

(3. Effects of Information Processing Device According to Present Disclosure)

As described above, the information processing device (the information processing device 100 in the embodiment) according to the present disclosure includes the calibration execution unit (the execution unit 195 in the embodiment). The calibration execution unit performs calibration between two or more sensors (the imaging unit 13 and the measurement unit 14 in the embodiment) which are attached at different positions and of which visual field regions at least partially overlap each other. Further, the calibration execution unit performs calibration between sensors in a case where a feature point that enables calibration of each of two or more sensors can be acquired in a region in which visual fields of the two or more sensors overlap each other.

As described above, the information processing device according to the present disclosure performs calibration between sensors in a case where a feature point that enables calibration of each of two or more sensors can be acquired in a region in which visual fields of the two or more sensors overlap each other. As a result, the information processing device according to the present disclosure can perform calibration even for a region with no map information without being affected by an environment change.

The two or more sensors are sensors attached to the vehicle. As a result, the information processing device according to the present disclosure can perform calibration between sensors mounted on the vehicle even for a region with no map information without being affected by an environment change.

At least one of the two or more sensors is a camera. Then, the calibration execution unit recognizes an image captured by the camera, and acquires a feature point that enables calibration of each of the camera and a sensor other than the camera in the captured image. As a result, the information processing device according to the present disclosure can perform calibration between sensors.

Further, the calibration execution unit performs calibration between sensors in a case where a specific object having a feature point that enables calibration of each of two or more sensors is present in a region in which visual fields of the two or more sensors overlap each other. As a result, the information processing device according to the present disclosure can acquire a feature point necessary for calibration between sensors from a specific object.

In addition, the specific object having the feature point that enables calibration is another vehicle. As a result, the information processing device according to the present disclosure can acquire a feature point necessary for calibration between sensors from another vehicle.

Furthermore, the information processing device according to the present disclosure receives, by vehicle-to-vehicle communication, information regarding whether or not another vehicle having a feature point that enables calibration between two or more sensors is present in an acquirable range around the host vehicle. As a result, the information processing device according to the present disclosure can quickly grasp the position of another vehicle by vehicle-to-vehicle communication.

Furthermore, the information processing device according to the present disclosure receives, by V2X communication, information regarding whether or not another vehicle having a feature point that enables calibration between two or more sensors is present in an acquirable range around the host vehicle. As a result, the position of another vehicle can be quickly grasped by V2X communication.

Furthermore, the information processing device according to the present disclosure receives position information of another vehicle having a feature point that enables calibration. As a result, the information processing device according to the present disclosure can grasp the positional relationship between the host vehicle and another vehicle.

Furthermore, the information processing device according to the present disclosure receives posture information of another vehicle having a feature point that enables the calibration. As a result, the information processing device according to the present disclosure can grasp whether or not the feature point can be acquired from another vehicle.

Furthermore, the information processing device according to the present disclosure further includes the determination unit (the determination unit 194 in the embodiment). The determination unit acquires position information and posture information of two or more sensors or a vehicle to which two or more sensors are attached, and position information and posture information of a specific object having a feature point that enables calibration of each of the two or more sensors. Then, the determination unit determines whether or not the feature point that enables calibration of each of the two or more sensors is in an acquirable state. As a result, the information processing device according to the present disclosure can accurately determine whether or not a feature point can be acquired from a specific object.

In addition, the sensor is a camera, and the specific object having the feature point that enables calibration is a checkerboard installed in another vehicle. As a result, the information processing device according to the present disclosure can easily acquire the feature point used for calibration of the camera.

In addition, the sensor is a millimeter wave radar, and the specific object having the feature point that enables calibration is a corner reflector installed in another vehicle. As a result, the information processing device according to the present disclosure can easily acquire the feature point used for calibration of the millimeter wave radar.

(4. Hardware Configuration)

Figure 7:
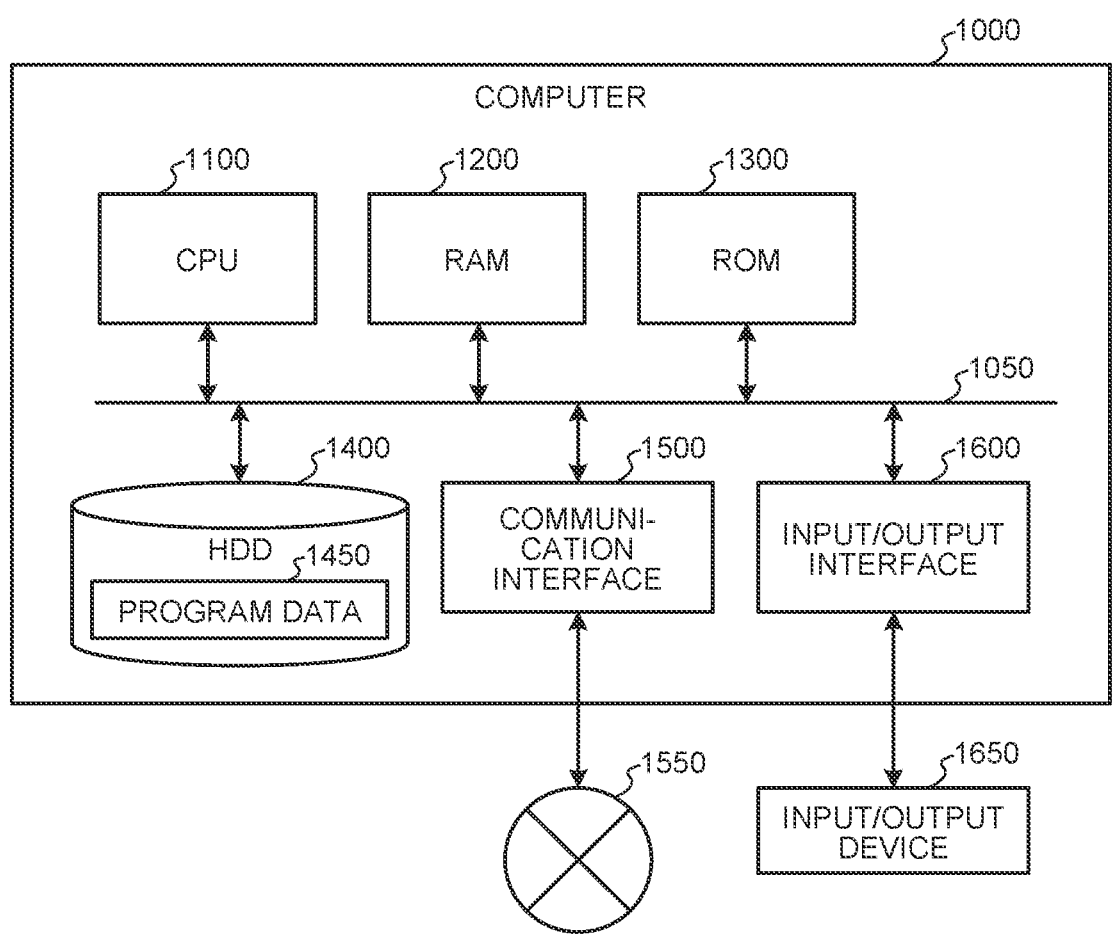
FIG. 7 is a hardware configuration diagram illustrating an example of a computer that implements functions of the information processing device of the present disclosure.

The information processing performed by the information processing device 100 according to each embodiment described above is implemented by, for example, a computer 1000 having a configuration as illustrated in FIG. 7. Hereinafter, the information processing device 100 according to the embodiment of the present disclosure will be described as an example. FIG. 7 is a hardware configuration diagram illustrating an example of the computer 1000 that implements the functions of the information processing device 100 of the present disclosure. The computer 1000 includes a CPU 1100, a RAM 1200, a read only memory (ROM) 1300, a hard disk drive (HDD) 1400, a communication interface 1500, and an input/output interface 1600. Each component of the computer 1000 is connected by a bus 1050.

The CPU 1100 is operated on the basis of a program stored in the ROM 1300 or the HDD 1400, and controls each component. For example, the CPU 1100 loads the program stored in the ROM 1300 or the HDD 1400 on the RAM 1200 and performs processing corresponding to various programs.

The ROM 1300 stores a boot program such as a basic input output system (BIOS) executed by the CPU 1100 when the computer 1000 is started, a program that depends on the hardware of the computer 1000, or the like.

The HDD 1400 is a recording medium that is readable by the computer 1000, in which a program executed by the CPU 1100, data used by the program, or the like, is non-temporarily recorded. Specifically, the HDD 1400 is a recording medium in which a program for implementing antenna switching process illustrated in FIG. 3, for example, is recorded.

The communication interface 1500 is an interface for the computer 1000 to be connected to an external network 1550 (for example, the Internet). For example, the CPU 1100 receives data from another equipment or transmits data generated by the CPU 1100 to another equipment via the communication interface 1500.

The input/output interface 1600 is an interface for connecting an input/output device 1650 and the computer 1000 to each other. For example, the CPU 1100 receives data from an input device such as a keyboard or mouse via the input/output interface 1600. Further, the CPU 1100 transmits data to an output device such as a display, a speaker, or a printer via the input/output interface 1600. Further, the input/output interface 1600 may function as a medium interface for reading a program or the like recorded in a predetermined recording medium. Examples of the medium include an optical recording medium such as a digital versatile disc (DVD) or a phase change rewritable disk (PD), a magneto-optical recording medium such as a magneto-optical disk (MO), a tape medium, a magnetic recording medium, and a semiconductor memory.

For example, in a case where the computer 1000 functions as a reception device 10 according to a first embodiment, the CPU 1100 of the computer 1000 executes a program loaded on the RAM 1200 (such as a program for implementing the information processing of the present disclosure). As a result, the functions such as various types of processing performed by the control unit 109 of the information processing device 100 are implemented. In addition, the HDD 1400 stores a program for implementing the information processing of the present disclosure, data stored in the storage unit 111, and the like. Note that the CPU 1100 reads program data 1450 from the HDD 1400 and executes the program data 1450, but as another example, these programs may be acquired from another device via the external network 1550.

Note that the present technology can also have the following configurations.

(1)

An information processing device comprising:

a calibration execution unit that performs calibration between two or more sensors which are attached at different positions and of which visual field regions at least partially overlap each other, wherein the calibration execution unit performs the calibration between the sensors in a case where a feature point that enables calibration of each of the two or more sensors is acquirable in a region in which visual fields of the two or more sensors overlap each other.

(2)

The information processing device according to (1), wherein the two or more sensors are sensors attached to a vehicle.

(3)

The information processing device according to (2), further comprising:

an acquisition unit that acquires information regarding whether or not a specific object having the feature point that enables the calibration between the two or more sensors is present in an acquirable range around the vehicle; and a determination unit that determines whether or not the feature point is acquirable from the specific object in the region in which the visual fields of the two or more sensors overlap each other in a case where the specific object is present in the acquirable range around the vehicle, wherein in a case where the specific object having the feature point that enables the calibration of each of the two or more sensors is present in the region in which the visual fields of the two or more sensors overlap each other, the determination unit determines whether or not the feature point is acquirable from the specific object, and the calibration execution unit acquires the feature point in a case where the determination unit determines that the feature point is acquirable.

(4)

The information processing device according to (3), wherein at least one of the two or more sensors is a camera, and the calibration execution unit recognizes an image captured by the camera and acquires the feature point that enables the calibration of each of the camera and the sensor other than the camera in the captured image.

(5)

The information processing device according to (3), wherein the acquisition unit receives information regarding whether or not the specific object is present in the acquirable range around the vehicle by V2X communication.

(6)

The information processing device according to (3), wherein the acquisition unit receives information regarding whether or not the specific object is present in the acquirable range around the vehicle by vehicle-to-vehicle communication.

(7)

The information processing device according to (3), wherein the acquisition unit receives position information and posture information of the specific object, and the determination unit determines whether or not the feature point is acquirable from the specific object on a basis of position information and posture information of the two or more sensors or the vehicle to which the two or more sensors are attached, and the position information and the posture information of the specific object having the feature point that enables the calibration of each of the two or more sensors.

(8)

The information processing device according to (3), wherein at least one of the two or more sensors is a camera, and the specific object is a checkerboard installed in another vehicle.

(9)

The information processing device according to (3), wherein at least one of the two or more sensors is a millimeter wave radar, and the specific object is a corner reflector installed in another vehicle.

(10)

The information processing device according to (3), wherein the specific object is another vehicle.

(11)

An information processing method performed by a computer, the information processing method comprising:

performing calibration between two or more sensors which are attached at different positions and of which visual field regions at least partially overlap each other in a case where a feature point that enables calibration of each of the two or more sensors is acquirable in a region in which visual fields of the two or more sensors overlap each other.

(12)

An information processing program causing a computer to:

perform calibration between two or more sensors which are attached at different positions and of which visual field regions at least partially overlap each other in a case where a feature point that enables calibration of each of the two or more sensors is acquirable in a region in which visual fields of the two or more sensors overlap each other.

REFERENCE SIGNS LIST 1, 2 VEHICLE
3 MANAGEMENT DEVICE
12 RECEPTION UNIT
13 IMAGING UNIT
14 MEASUREMENT UNIT
15 DETECTION UNIT
100 INFORMATION PROCESSING DEVICE
101 COMMUNICATION UNIT
103 INPUT UNIT
105 OUTPUT UNIT
107 STORAGE UNIT
109 CONTROL UNIT
191 PROVIDING UNIT
192 ACQUISITION UNIT
193 RECOGNITION UNIT
194 DETERMINATION UNIT
195 EXECUTION UNIT

The invention claimed is:

1. An information processing device, comprising:
a central processing unit (CPU) configured to:
perform calibration between two or more sensors which are attached at different positions of a vehicle and of which visual field regions at least partially overlap each other,
wherein the calibration between the two or more sensors is performed in a case where a feature point that enables the calibration of each of the two or more sensors is acquirable in a region in which the visual fields of the two or more sensors overlap each other;
acquire information regarding whether a specific object, having the feature point that enables the calibration between the two or more sensors, is present in an acquirable range around the vehicle, wherein
the acquired information include position information and posture information of the specific object;
determine whether the feature point is acquirable from the specific object, in the region in which the visual fields of the two or more sensors overlap each other, in a case where the specific object is present in the acquirable range around the vehicle,
wherein whether the feature point is acquirable from the specific object is determined based on position information and posture information of the two or more sensors or the vehicle to which the two or more sensors are attached, and the position information and the posture information of the specific object having the feature point that enables the calibration of each of the two or more sensors; and
acquire the feature point in a case where the CPU determines that the feature point is acquirable.

2. The information processing device according to claim 1, wherein
the two or more sensors comprises a camera and a sensor, and the CPU is further configured to:
recognize an image captured by the camera; and
acquire the feature point, that enables the calibration of each of the camera and the sensor, in the captured image.

3. The information processing device according to claim 1, wherein the CPU is further configured to receive information regarding whether the specific object is present in the acquirable range around the vehicle by road-to-vehicle communication (V2X communication).

4. The information processing device according to claim 1, wherein the CPU is further configured to receive information regarding whether the specific object is present in the acquirable range around the vehicle by vehicle-to-vehicle communication.

5. The information processing device according to claim 1, wherein
at least one of the two or more sensors is a camera, and
the specific object is a checkerboard installed in another vehicle.

6. The information processing device according to claim 1, wherein
at least one of the two or more sensors is a millimeter wave radar, and
the specific object is a corner reflector installed in another vehicle.

7. The information processing device according to claim 1, wherein the specific object is another vehicle.

8. An information processing method, comprising:
performing calibration between two or more sensors which are attached at different positions of a vehicle and of which visual field regions at least partially overlap each other,
wherein the calibration between the two or more sensors is performed in a case where a feature point that enables the calibration of each of the two or more sensors is acquirable in a region in which the visual fields of the two or more sensors overlap each other;
acquiring information regarding whether a specific object, having the feature point that enables the calibration between the two or more sensors, is present in an acquirable range around the vehicle, wherein
the acquired information include position information and posture information of the specific object;
determining whether the feature point is acquirable from the specific object, in the region in which the visual fields of the two or more sensors overlap each other, in a case where the specific object is present in the acquirable range around the vehicle,
wherein whether the feature point is acquirable from the specific object is determined based on position information and posture information of the two or more sensors or the vehicle to which the two or more sensors are attached, and the position information and the posture information of the specific object having the feature point that enables the calibration of each of the two or more sensors; and
acquiring the feature point in a case where the feature point is determined as acquirable.

9. A non-transitory computer-readable medium having stored thereon, computer-executable instructions that when executed by a computer, causes the computer to execute operations for causing a wind measuring device to perform a wind speed measuring process, the operations comprising:
performing calibration between two or more sensors which are attached at different positions of a vehicle and of which visual field regions at least partially overlap each other,
wherein the calibration between the two or more sensors is performed in a case where a feature point that enables the calibration of each of the two or more sensors is acquirable in a region in which the visual fields of the two or more sensors overlap each other;

acquiring information regarding whether a specific object, having the feature point that enables the calibration between the two or more sensors, is present in an acquirable range around the vehicle, wherein
the acquired information include position information and posture information of the specific object;
determining whether the feature point is acquirable from the specific object, in the region in which the visual fields of the two or more sensors overlap each other, in a case where the specific object is present in the acquirable range around the vehicle,
wherein whether the feature point is acquirable from the specific object is determined based on position information and posture information of the two or more sensors or the vehicle to which the two or more sensors are attached, and the position information and the posture information of the specific object having the feature point that enables the calibration of each of the two or more sensors; and
acquiring the feature point in a case where the feature point is determined as acquirable.

* * * * *